(12) United States Patent
Lewis (10) Patent No.: US 9,350,425 B1
(45) Date of Patent: May 24, 2016

(54) MEMORIAL DATA SYSTEM (71) Applicant: James Tanner Lewis, North Port, FL (US)

(72) Inventor: James Tanner Lewis, North Port, FL (US)

(*) Notice: Subject to any disclaimer, the term of this patent is extended or adjusted under 35 U.S.C. 154(b) by 0 days.

(21) Appl. No.: 14/594,338

(22) Filed: Jan. 12, 2015

Related U.S. Application Data (60) Provisional application No. 61/926,609, filed on Jan. 13, 2014.

(51) Int. Cl.
*H04B 5/00* (2006.01)
*A61G 99/00* (2006.01)
*A61G 17/08* (2006.01)
*E04H 13/00* (2006.01)

(52) U.S. Cl.
CPC .............. *H04B 5/0068* (2013.01); *A61G 17/08* (2013.01); *A61G 99/00* (2013.01); *E04H 13/003* (2013.01); *H04B 5/0031* (2013.01)

(58) Field of Classification Search
CPC ........... H03H 2/008; H03D 11/02; H03J 3/06; H04B 1/0458
USPC ............. 455/41.1, 290, 292, 3.06, 3.03, 41.2; 340/10.4, 10.1, 10.3
See application file for complete search history.

(56) References Cited

U.S. PATENT DOCUMENTS

| | | |
|---|---|---|
| 6,340,978 B1 | 1/2002 | Mindrum |
| 7,014,101 B1 | 3/2006 | Kennedy |
| 7,126,481 B2 | 10/2006 | Vesikivi et al. |
| 7,222,120 B1 | 5/2007 | Mindrum |
| 7,287,225 B2 | 10/2007 | Mindrum |
| 7,348,875 B2 * | 3/2008 | Hughes et al. ...... G06K 19/0717 340/10.1 |
| 7,433,649 B2 | 10/2008 | Toulis et al. |
| 7,609,506 B2 | 10/2009 | Aguirre |
| 7,624,344 B2 | 11/2009 | Mindrum et al. |
| 7,657,835 B2 | 2/2010 | Mindrum et al. |
| 7,671,902 B2 | 3/2010 | Mindrum et al. |
| 7,756,467 B2 | 7/2010 | Bent et al. |
| 7,984,380 B2 | 7/2011 | Mindrum |
| 8,326,281 B2 | 12/2012 | Hill |
| 8,433,722 B2 | 4/2013 | Shin et al. |
| 8,909,670 B2 | 12/2014 | Neal et al. |
| 2002/0149468 A1* | 10/2002 | Carrender et al. . G06K 19/0723 340/5.61 |
| 2003/0076230 A1* | 4/2003 | Runyon et al. ...... G08B 13/1427 340/572.1 |
| 2003/0120745 A1 | 6/2003 | Katagishi et al. |
| 2006/0154642 A1* | 7/2006 | Scannell .................. A01G 9/02 455/404.1 |
| 2009/0224868 A1* | 9/2009 | Liu et al. ................ B21D 55/00 340/5.1 |
| 2010/0095559 A1* | 4/2010 | Buckner ............... E02F 3/8825 37/304 |
| 2011/0025473 A1* | 2/2011 | Rokhsaz et al. .... H04L 63/0853 340/10.4 |
| 2014/0211961 A1* | 7/2014 | Koch ..................... G08C 17/02 381/77 |

* cited by examiner

*Primary Examiner* — Edward Urban
*Assistant Examiner* — Mohammed Rachedine
(74) *Attorney, Agent, or Firm* — Frijouf, Rust & Pyle, P.A.

(57) ABSTRACT

A memorial data system is disclosed for providing information regarding an individual. The memorial data system comprises a marker for identifying the individual. A transponder circuit is coupled to the marker. A data is stored within the transponder circuit. A mobile electrical device transmits an electromagnetic field in close proximity to the transponder circuit. The transponder circuit receives the electromagnetic field for powering the transponder circuit. The transponder circuit transmits the data to the mobile electronic device. The mobile electronic device utilizes the data to access an electronic file on a network. The electronic file includes information regarding the individual.

19 Claims, 9 Drawing Sheets

MEMORIAL DATA SYSTEM

CROSS-REFERENCE TO RELATED APPLICATIONS

This application claims benefit of U.S. Patent Provisional application Ser. No. 61/926,609 filed Jan. 13, 2014. All subject matter set forth in provisional application Ser. No. 61/926,609 is hereby incorporated by reference into the present application as if fully set forth herein.

BACKGROUND OF THE INVENTION

1. Field of the Invention

This invention relates to a data system and more particularly to a memorial data system for providing information regarding an object.

2. Background of the Invention

Memorials of persons, places or events are traditionally honored with a physical reminder of the past. With memorials of deceased persons the common memorial is a tombstone, engraved, but with very limited information thereon. Busts or statues of persons, both living and deceased are often displayed to remind the visitor of the person. Again, only a limited amount of information may accompany the person's likeness. Plaques are generally used to memorialize the significance of a place or an event, and again, only a limited amount of information may be displayed.

The common deficiency with these memorials is the limited amount of information that may be provided to the visitor of the memorial. As years pass, memories of the person, place or event fades and is therefore lost to the new visitor to the memorial. The need for a system capable of providing an unlimited amount of information is well established.

The memorial visitor must be able to easily access the information without interfering with other visitors, some of whom may not be interested in the detailed information.

The available information may be in text, audio, still photo or video form. The information available to the visitor should be off site in order to allow the person(s) providing the information the ability to easily modify the available information Some in the prior art have incorporated computer based systems with limited success. The use of near field transmitters to trigger some systems has also shown promise.

There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 6,340,978 to Mindrum discloses a user interface on a computer system which displays information about an entity, such as a person, a business, a pet, a country, etc. The screen is associated with the entity. A plurality of recordations are associated with the entity. The recordations are of at least two different types and are associated with the period of time. A plurality of selection mechanisms are on the screen. Each of the selection mechanisms are associated with at least one type of recordation. A time selection mechanism is adapted for selecting a period of time. The time selection mechanism is associated with at least a portion of the plurality of recordations and is operative to present one or more recordations which correspond with the selected period of time. The user interface can be accessed over a computer, either as a stand-alone or over a network, whereas on a memorial such as in a headstone U.S. Pat. No. 7,014,101 to Kennedy discloses an internet-facilitated system and method for retrieval of ancestral information relating to a deceased person. A medallion is permanently attached to a gravestone at the gravesite of the deceased person. The medallion bears viewable indicia including an identification number (I.D.) facing outwardly when the medallion is permanently attached to the gravestone. The I.D. is assigned is unique to the deceased person. A host computer database is configured to include ancestral information related to the deceased person retrievable via the Internet from a remote personal computer (P.C.) terminal. The information typically includes known ancestors, descendents, family history genetic/DNA profiles and exact geographic location of the gravesites of each of the deceased persons subscribed to the system according to each particular I.D. whereby individuals interested in obtaining the ancestral information with respect to a particular decedent, once knowing the particular I.D. on the medallion affixed to the gravestone, may do so by accessing the database via the internet from the remote P.C. and referencing the particular I.D.

U.S. Pat. No. 7,126,481 to Vesikivi, et al. discloses Systems, devices and methods for providing dynamic tailored product information to mobile terminals as a result of reading short-range wireless communication tags, such as RFID tags. The invention is able to provide consumer related product information to consumer operated terminals and retailer related product information to retailer or employee operated terminals, without requiring separate transponders or unique reading devices. In addition, the invention is able to accomplish providing dynamic information in a highly efficient and user-friendly manner and without requiring additional memory at the tag level.

U.S. Pat. No. 7,222,120 to Mindrum discloses methods of providing a registry service and a registry service. A remote storage location houses information regarding an entity or an event, and from time to time the remote storage location receives information regarding the entity or the event. Further, a string associated with a good identifies the storage location, whereupon remote access to the storage location may be achieved, if a proper access level is present. Moreover, a registry service includes an identifying string located on a good along with a tag that uniquely identifies an entity or an event. The service controls storage, which is logically segmented and associated with the tag, and an access set of executable instructions is operable to provide remote access to the logically segmented storage using identifying information to determine the tag. Information regarding the entity and event may also be warehoused such that specific data regarding the entity or event is retrievable remotely upon a request U.S. Pat. No. 7,287,225 to Mindrum discloses a user interface on a computer system which displays information about an entity, such as a person, a business, a pet, a country, etc. The screen is associated with the entity. A plurality of recordations are associated with the entity. The recordations are of at least two different types and are associated with the period of time. A plurality of selection mechanisms are on the screen. Each of the selection mechanisms are associated with at least one type of recordation. A time selection mechanism is adapted for selecting a period of time. The time selection mechanism is associated with at least a portion of the plurality of recordations and is operative to present one or more recordations which correspond with the selected period of time. The user interface can be accessed over a computer, either as a stand-alone or over a network, whereas on a memorial such as in a headstone.

U.S. Pat. No. 7,433,649 to Toulis, et al. discloses a tag which can be associated with one or more individuals and/or a connection to a predetermined network resource, and which can be used to facilitating interaction of the wireless communication device with the corresponding individual(s) and/or resource. The tag includes a transmitter and a storage element including an ID value, which associates the tag with the individual(s) and/or resource. In at least some instances the tag will additionally include a trigger element, such as a user actuatable switch, which will enable an action to be initiated in the nearby wireless communication device, relative to the associated individual(s) and/or resource, in response to an actuation of the trigger element in the tag.

U.S. Pat. No. 7,609,506 to Aguirre discloses a multimedia player used in conjunction with a grave marker to pay tribute to a decedent. A main body portion of the player supports an opaque solar panel portion that also provides a barrier protecting a video screen on the main body portion of the multimedia player from sunlight damage. The solar panel is hinged as a door over the screen and has a wireless interface to a memory card player of the main body portion. The solar panel provides a recharging voltage via the wireless interface to the electronics module to recharge a lithium ion battery that powers the multimedia player. A flash memory reader contains the tribute on a memory card of any format.

U.S. Pat. No. 7,624,344 to Mindrum, et al. discloses a method and system for creating a commemorative presentation. The subject of the commemoration can take a variety of forms, including living or deceased individuals, organizations, entities, companies, cities, and the like. A plurality of images are compiled related to the subject. Configuration data is created relating to the display of the plurality of images. The plurality of images and configuration data are stored in a datastore. A video is dynamically created by accessing the plurality of images and configuration data stored in the datastore and sequentially displaying the plurality of images stored in the datastore in conformance with the configuration data stored in the datastore. While the invention has utility in a number of different applications, one particularly well suited application is in the death care industry for creating commemorative videos for the recently deceased U.S. Pat. No. 7,657,835 to Mindrum, et al. discloses a method and system for creating a commemorative presentation. The subject of the commemoration can take a variety of forms, including living or deceased individuals, organizations, entities, companies, cities, and the like. A plurality of images are compiled related to the subject. Configuration data is created relating to the display of the plurality of images. The plurality of images and configuration data are stored in a database. A video is dynamically created by accessing the plurality of images and configuration data stored in the datastore and sequentially displaying the plurality of images stored in the datastore in conformance with the configuration data stored in the datastore. While the invention has utility in a number of different applications, one particularly well suited application is in the death care industry for creating commemorative videos for the recently deceased.

U.S. Pat. No. 7,671,902 to Mindrum, et al. discloses images captured at a venue and relating to one or more patrons of the venue incorporated into one or more products in accordance with image selections and/or product selections made by the patron(s). The images may be captured at venues with a variety of image capture devices such as pre-mounted cameras, cell phones, cameras brought by patrons to the venue, or cameras provided to patrons by the venue or another entity. The patrons may obtain products such as T-shirts, coffee mugs, prints, slideshows, or other products incorporating one or more selected images. Patrons may also view the images on portable electronic devices.

U.S. Pat. No. 7,756,467 to Bent, et al. discloses a wireless communication device including a Near Field Communication (NFC) interface, a transceiver, and a controller. The NFC interface receives data related to multimedia content from an external NFC tag responsive to establishing an NFC link with the NFC tag. Based on the received data, the controller establishes a communication link with a multimedia server via a wireless communication network, and controls the multimedia server to download information associated with the multimedia content to a user-specified destination device.

U.S. Pat. No. 7,984,380 to Mildrum discloses UnitBook definitions which can be dynamically created based on content provided by a user. Such dynamic creation can include organization of user-supplied content into appropriate form, adjustment of book cover properties to match the user-supplied content, and verification that the user supplied content is appropriate for presentation in book form. Various interfaces can also be provided which allow users to generate a book definition based on a minimum of information.

U.S. Pat. No. 8,326,281 to Hill discloses a wireless communications system which may include a near field communication (NFC) reference device configured to store object reference data for at least one object associated with a geographic location of the NFC device. The wireless communications system may also include a mobile wireless communications device that includes an NFC transceiver configured to communicate with the NFC device based upon proximity thereto, an image sensor, a display, and a controller. The controller may cooperate with the NFC transceiver, the image sensor, and the display. The controller may be configured to determine a sensed image from the image sensor. The controller may also be configured to select object reference data for the sensed image based upon communication with the NFC reference device, and display the object reference data and the sensed image on the display U.S. Pat. No. 8,433,722 to Shin, et al. discloses an objection identification system including a virtual object database (DB) in which a plurality of virtual objects is stored and a target virtual object. The virtual objects includes an attribute data set including an attribute value of a real object and a service data set including a service data related to the real object. The target virtual object determining part receives a real object identification data of a target real object previewed by a terminal to compute an attribute value of the target real object, and determines a virtual object having an attribute value matched to an attribute value of the computed target real object of plural virtual objects stored in the virtual object DB as a target virtual object. In this case, a service data included in the service data set of the determined target virtual object by the target virtual object determining part is transmitted to the terminal. Thus, it may provide Internet type based on a real object over a conventional Internet concept handing a virtual object. In addition, easy and intuitive wireless Internet environment may be realized, and various Internet service and new higher value-added business may be created.

United States Patent Application number 2003/0120745 to Katagishi, et al. discloses the present invention which makes possible smooth acquisition of product information from a server over a network and display of the information. A product is provided with an RFID. When the user operates a cellular phone to read information from the RFID, the phone calls the RFID by transmitting RF waves to it. Upon receiving response data from the RFID, the cellular phone extracts a server access address and product ID from the data without awaiting the user's instructions to acquire information, and automatically accesses the product information server, based on the server access address. The information acquired from the product information server is displayed on the cellular phone screen. Thereby, the user can promptly have the information about the product.

Although the aforementioned prior art have contributed to the development of the art of providing comprehensive amounts of information at memorial sites and elsewhere, none of these prior art patents have solved the needs of this art.

Therefore, it is an object of the present invention to provide an improved apparatus for the dissemination of unlimited amounts of information at a memorial site.

Another object of this invention is to provide an improved apparatus that is simple for the operator to use.

Another object of this invention is to provide an improved apparatus that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a memorial data system for providing information regarding an object. The object may include a living individual, a deceased individual, a memorial or other items or objects. The memorial data system comprises a marker for identifying the object. A transponder circuit is coupled to the marker. A data is stored within the transponder circuit. A mobile electrical device transmits an electromagnetic field in close proximity to the transponder circuit. The transponder circuit receives the electromagnetic field for powering the transponder circuit. The transponder circuit transmits the data to the mobile electronic device. The mobile electronic device utilizes the data to access an electronic file on a network. The electronic file includes information regarding the object.

In a more specific embodiment of the invention, a plaque housing has a rear plaque plate and a front plaque plate. The rear plaque plate includes an exterior side and an interior side. The front plaque plate includes an exterior side and an interior side. An adhesive gasket layer couples the interior side of the rear plaque plate with the interior side of the front plaque plate. The adhesive gasket defines a plaque void between the rear plaque plate with the front plaque plate. The transponder circuit is positioned within the plaque void. The exterior side of the rear plaque is coupled to the marker. The exterior side of the front plaque includes a second personal information.

In another embodiment of the invention, a plaque plate includes a front side and a rear side. A circuit recess is in the rear side of the plaque plate for receiving the transponder circuit. The rear side of the plaque plate is coupled to the marker. The front side of the plaque plate includes a second personal information.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
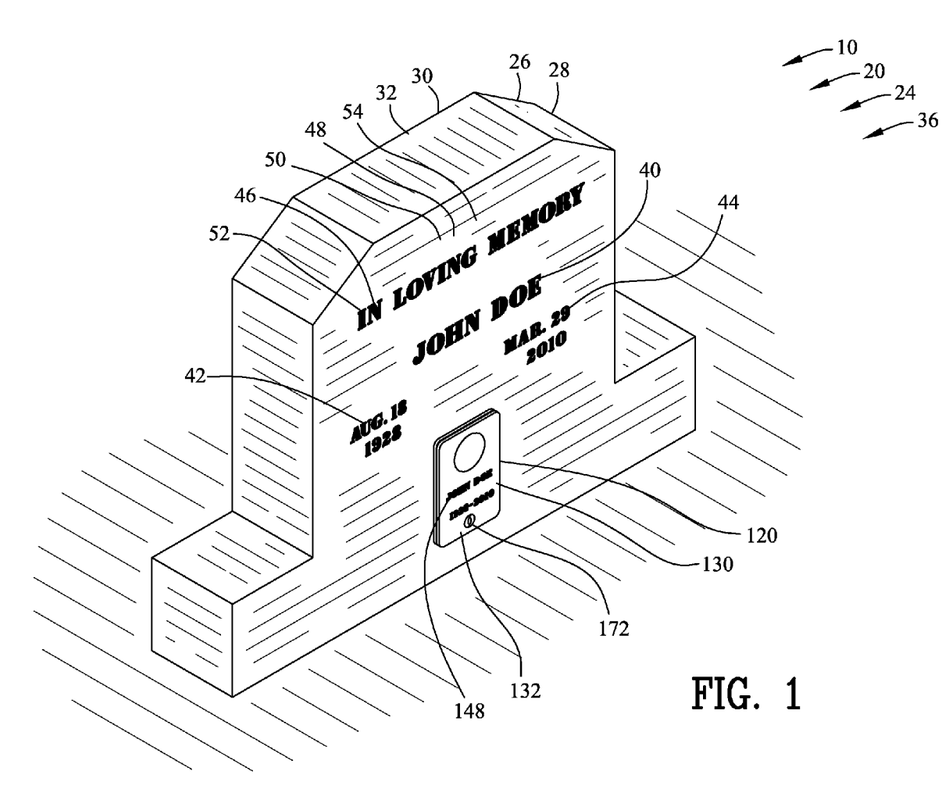
FIG. 1 is an isometric view of a headstone having a transponder circuit embedded within a plaque housing incorporating the present invention.
Figure 2:
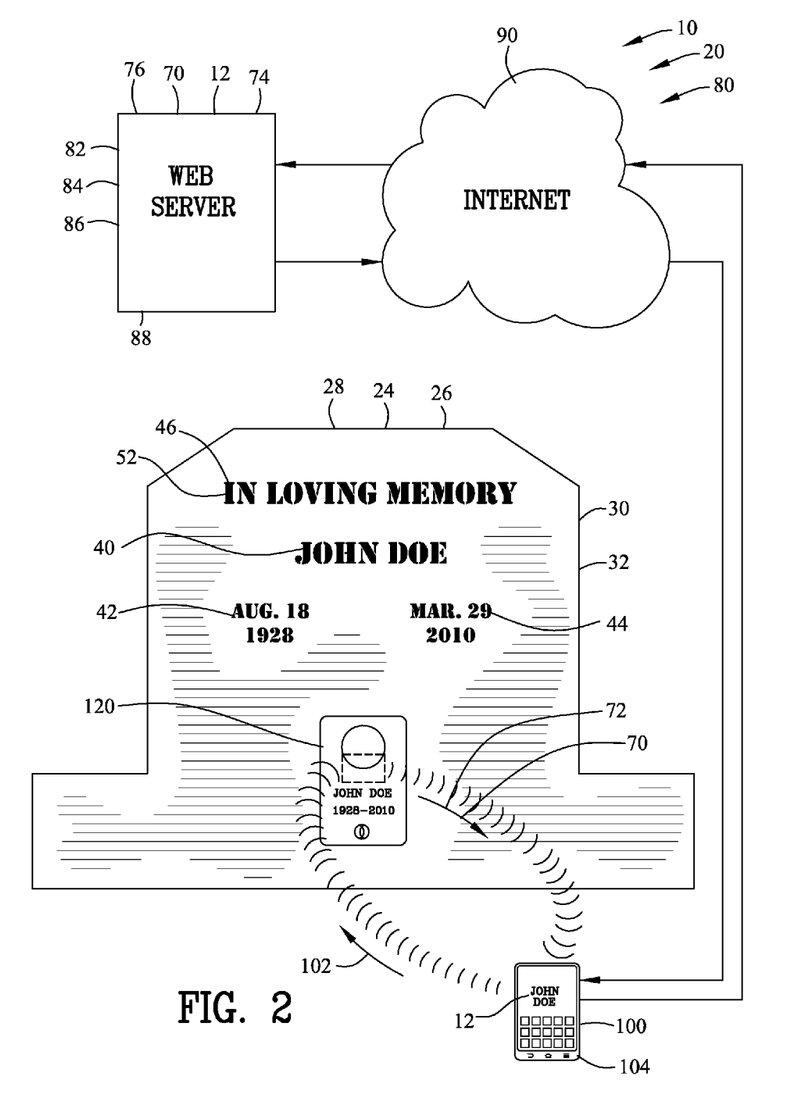
FIG. 2 is a front view of FIG. 1 wherein a mobile electrical device activates the transponder circuit and thereafter wirelessly retrieving data.
Figure 8:
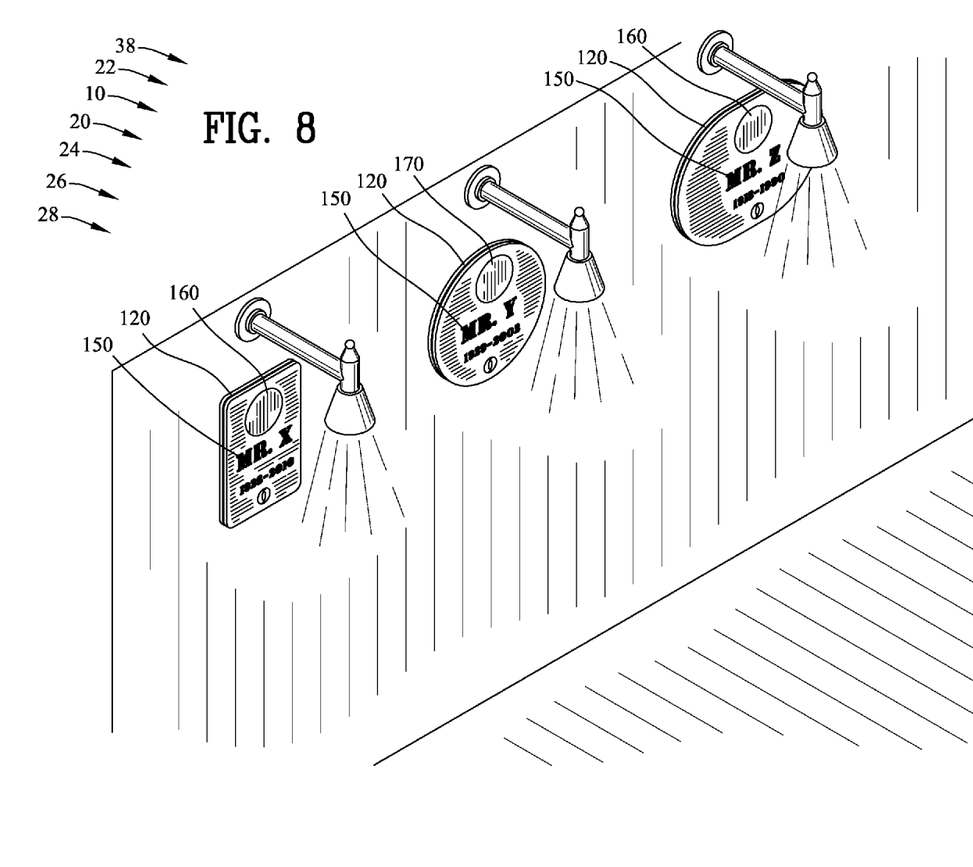
FIG. 8 is an isometric view of a plurality of plaque housings for multiple subject matters coupled to a wall.
Figures 9, 10, 11, 12:
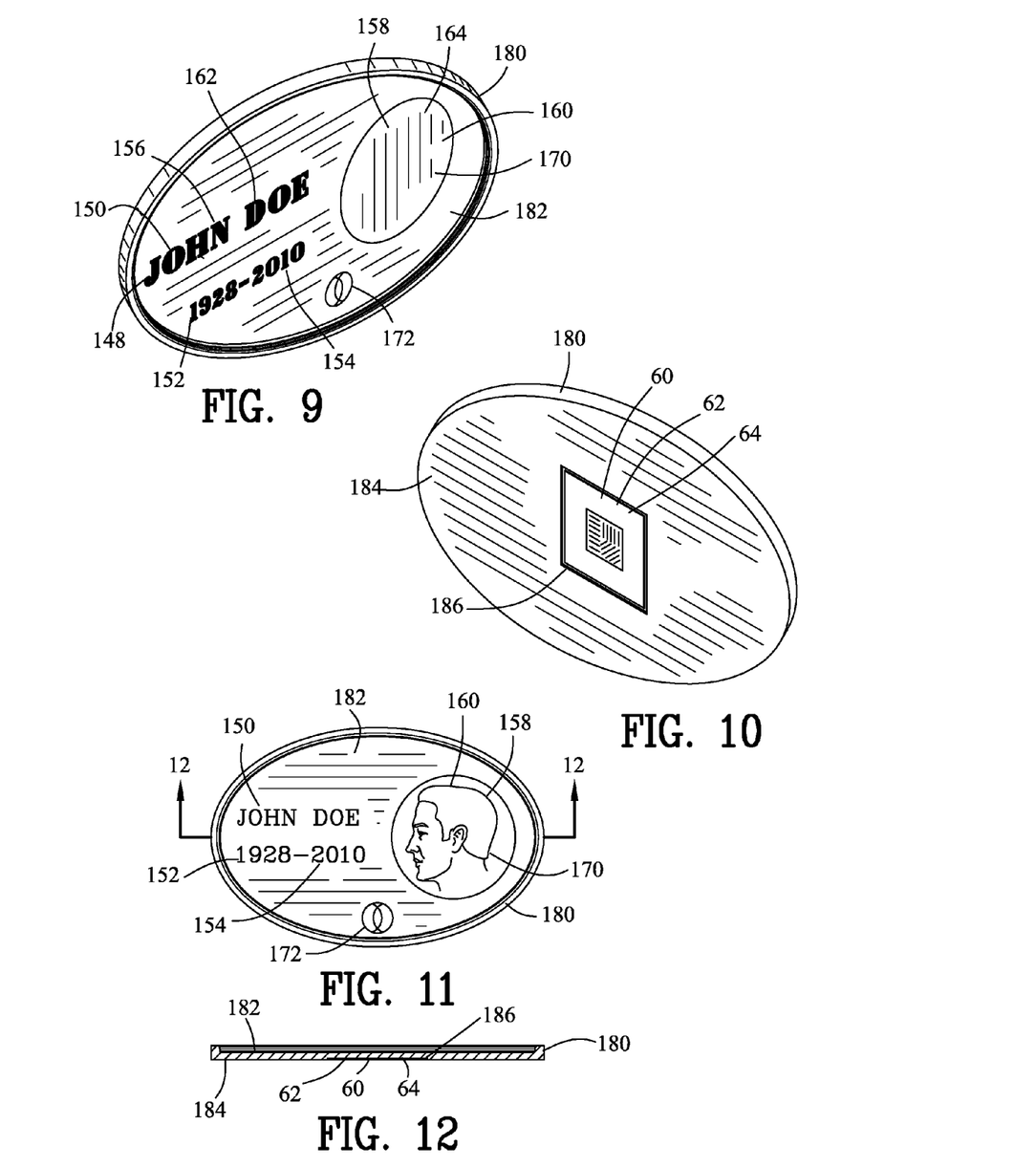
FIG. 9 is an isometric view of a plaque plate for receiving the transponder circuit.
FIG. 10 is a rear view of FIG. 9 illustrating a circuit recess for positioning the transponder circuit within the plaque plate.
FIG. 11 is a front view of FIG. 10 illustrating the plaque plate including a second personal information and a transponder circuit symbol.
FIG. 12 is a sectional view along line 12-12 in FIG. 11.
Figure 13:
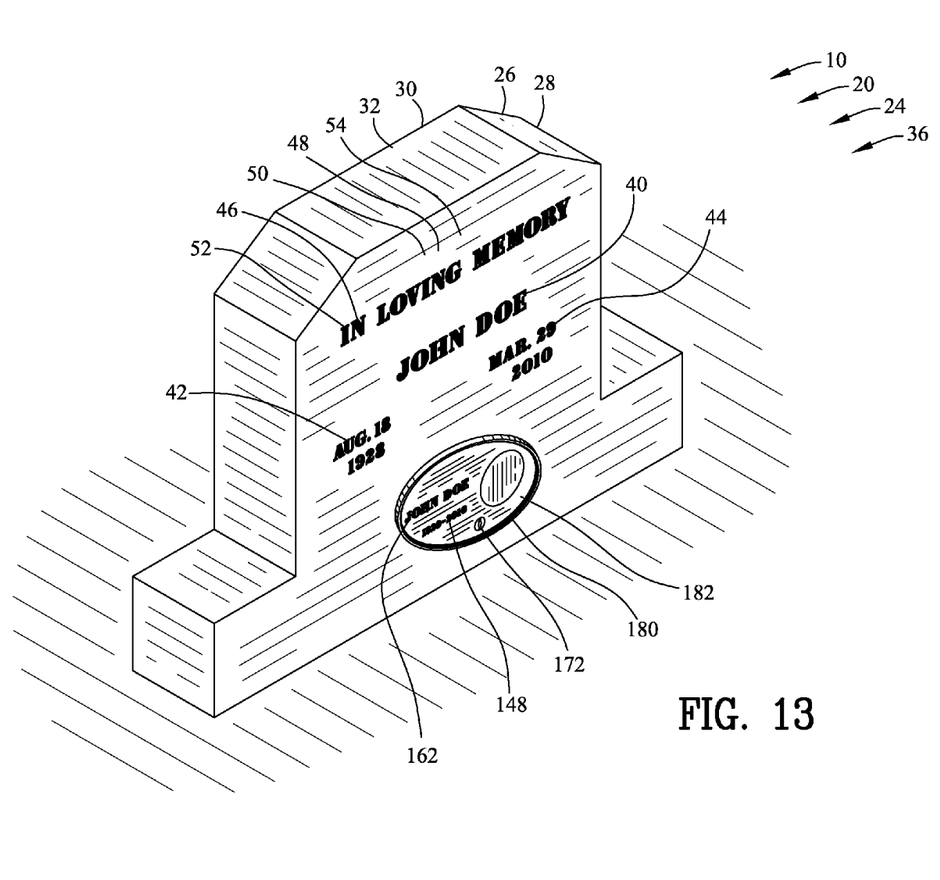
FIG. 13 is a view similar to FIG. 1 illustrating the plaque plate of FIG. 9 coupled to the headstone.
Figure 14:
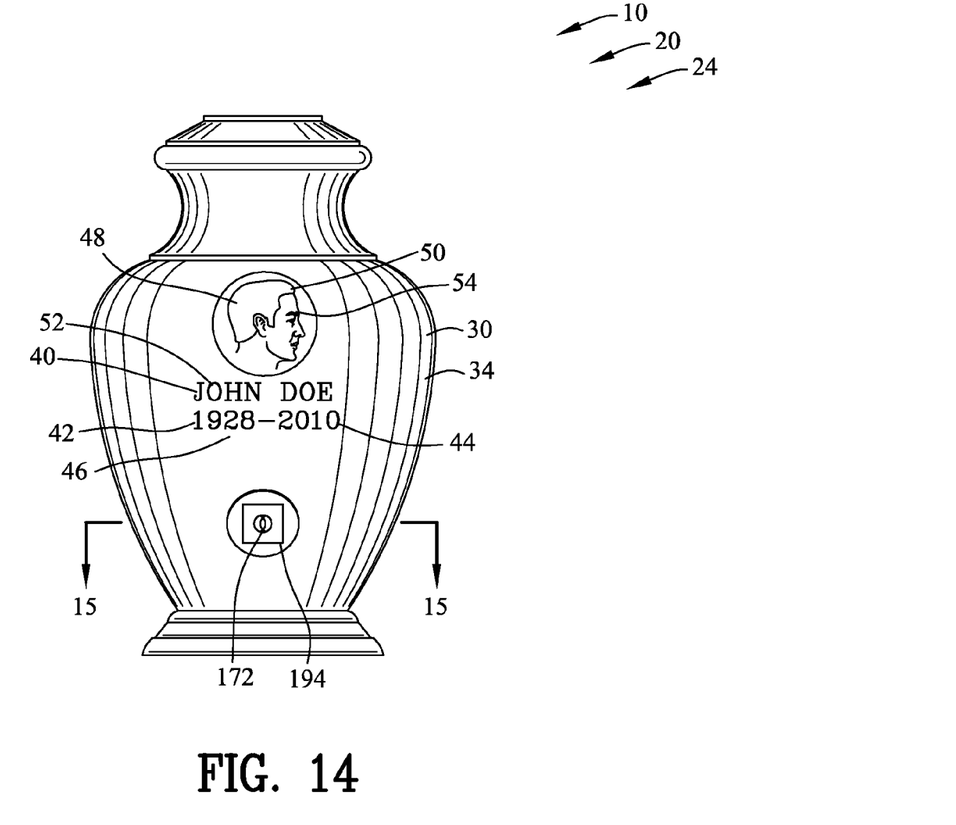
FIG. 14 is a front view of a urn including a circuit housing for receiving the transponder circuit.
Figure 15:
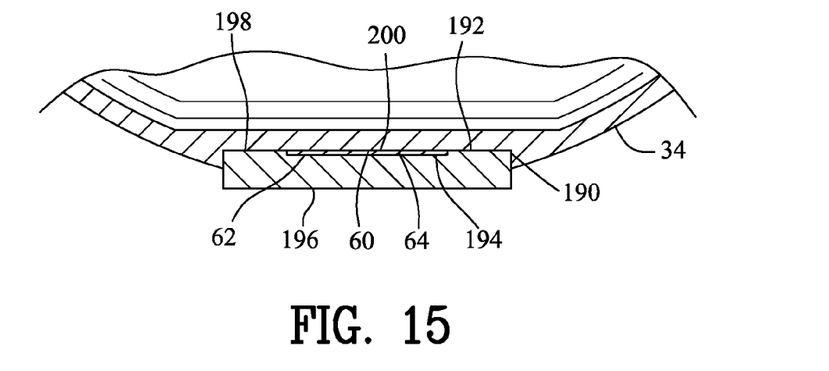
FIG. 15 is a sectional view along line 15-15 in FIG. 14.

FIGS. 1-15 illustrate a memorial data system 10 for providing information regarding an object 20. The object may include a living individual 22, a deceased individual 24, a memorial 26, a monument 28 or other items or objects. FIGS. 1-15 illustrate the object 20 including a deceased individual 24. FIGS. 1, 2 and 13 include a marker 30. More specifically, in FIGS. 1, 2 and 13 the marker 30 includes a headstone 32. However, the marker 30 may further include an urn 34 as illustrated in FIGS. 14 and 15. The marker 30 may also include a burial vault 36. FIG. 8 illustrates the marker 30, including a memorial 26 of multiple individuals 38, which may include sporting halls of fame, governmental monuments, musical composer memorial or other references to deceased individuals. The marker 30 identifies the object 20 so that a passerby will be able to identify the object 20 visually. The marker 30 may include the individual's name 40, date of birth 42, date of death 44, message 46, picture 48, photograph 50, text 52 and or designs 54.

As best shown in FIGS. 6, 7, 10, 11 and 15, a transponder circuit 60 is coupled to the marker 30. The transponder circuit 60 may include a near field communications circuit 62 hereinafter referred to as NFC 62. The NFC 62 may include a type 2 programmable, read only NFC 64. The NFC 64 is programmed to include a data 70. The data 70 may include a uniform resource locator 72, hereinafter referred to as a URL 72. The URL 72 may be associated with an electronic file 74 or webpage file 76 located within a network 80 or an online memorial database 82. The atomic file 74 or webpage file 76 may include a HTML document 84, a PHP document 86 or other electronic mediums. The online memorial database 82 may be stored within a Web server 88. The Web server 88 may be accessed through the World Wide Web or Internet 90.

Figure 3:
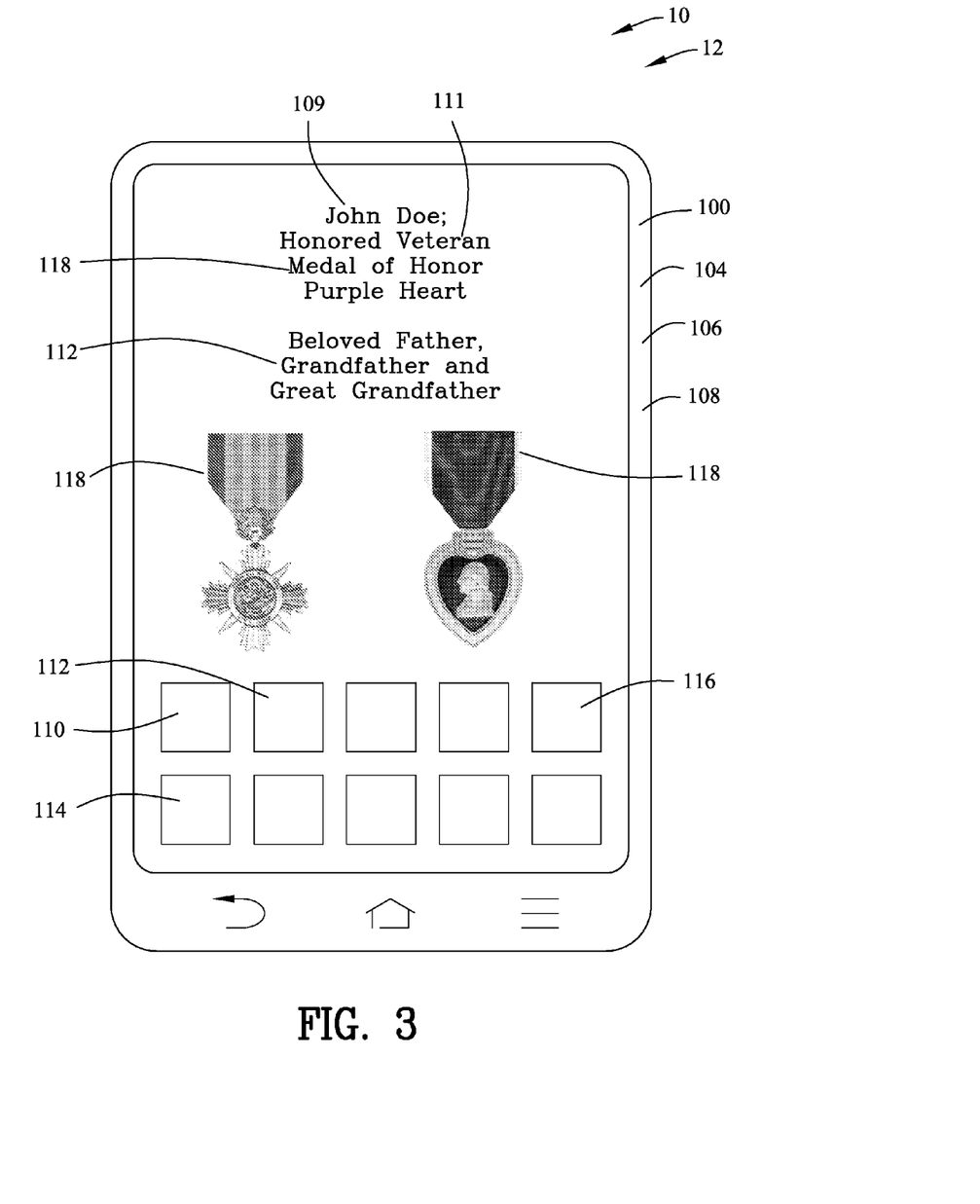
FIG. 3 is an enlarged view of a portion of FIG. 2 illustrating the mobile electrical device displaying the retrieved data.
Figures 4, 5:
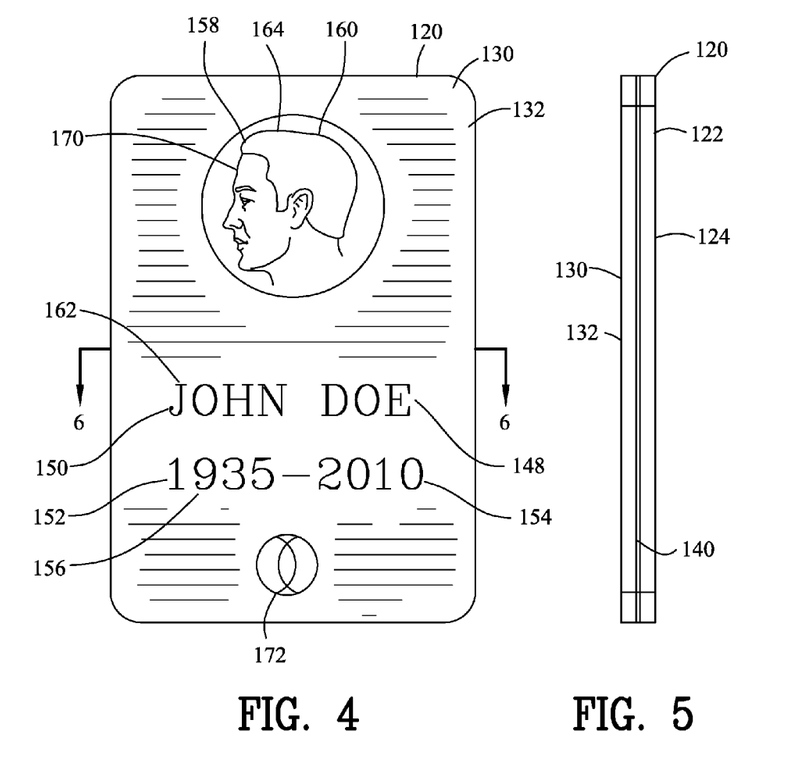
FIG. 4 is an enlarged view of a portion of FIG. 1 illustrating the plaque housing.
FIG. 5 is a side view of FIG. 4.
Figure 6:
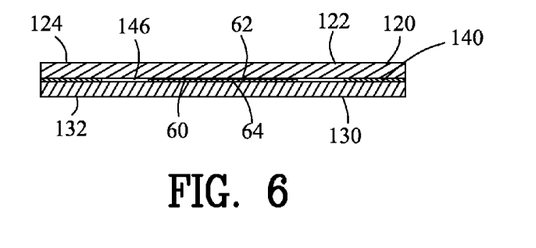
FIG. 6 is a sectional view along line 6-6 in FIG. 4.
Figure 7:
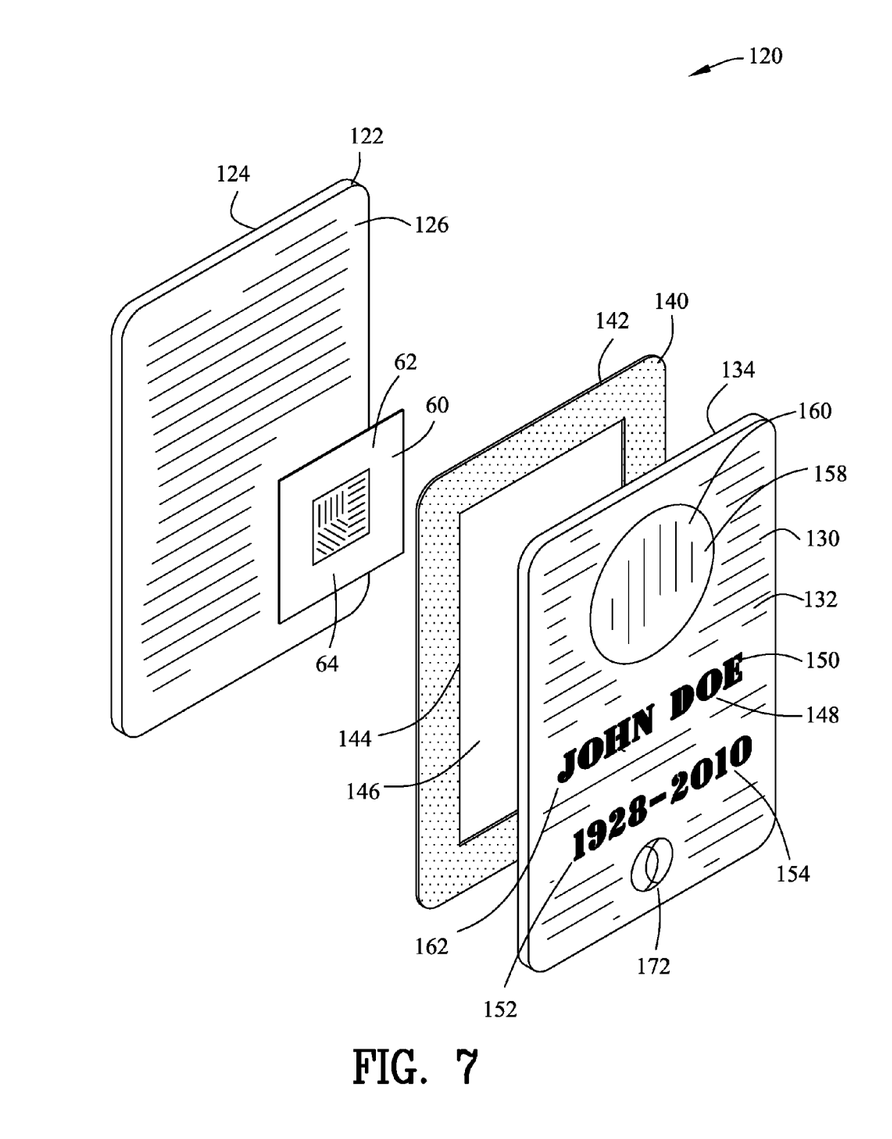
FIG. 7 is an exploded view of the plaque housing of FIG. 4.

As shown in FIGS. 2 and 3, a mobile electrical device 100 transmits an electromagnetic field 102 in close proximity to the transponder circuit 60. The mobile electrical device 100 may include mobile phone 104, tablet 106, mobile personal computer 108 or other electrical devices. The transponder circuit 60 receives the electromagnetic field 102 for powering the transponder circuit 60. The transponder circuit 60 thereafter transmits the data 70 wirelessly to the mobile electronic device 100. The mobile electronic device 100 utilizes the data 70 to access an electronic file 74 or webpage file 76 on a network 80. The electronic file 74 or webpage file 76 includes information 12 regarding the object 20.

As shown in FIG. 3, if the object 20 includes a headstone 32 of a deceased individual 24, the information 12 may include a name of the deceased individual 109, date of birth and death 111, biographic history 110, family tree 112, photographs 114, movies 116, awards 118. The information 12 may also include an) other information regarding the individuals past, accomplishments, education, humorous information, humorous videos, the individuals preferred charitable organizations, family contact information, videos of speeches or lecturers the individual performed, further links to the individual's other deceased family members, a map of the cemetery illustrating the location of the individual's other deceased family members location within the cemetery.

FIGS. 1-8 illustrate the transponder circuit 60 being positioned within a plaque housing 102. The plaque housing 102 has a rear plaque plate 122 and a front plaque plate. 130. The rear plaque plate 122 includes an exterior side 124 and an interior side 126. The front plaque plate 130 includes an exterior side 132 and an interior side 134. An adhesive gasket layer 140 couples the interior side 126 of the rear plaque plate 122 with the interior side 134 of the front plaque plate 130. Preferably, the adhesive gasket layer 140 includes a double-sided continuous adhesive strip 142 that defines an adhesive aperture 144. The adhesive aperture 144 of the adhesive gasket layer 140 defines a plaque void 146 between the rear plaque plate 122 with the front plaque plate. 130. The transponder circuit 60 is positioned within the plaque void 146.

The exterior side 124 of the rear plaque plate 122 is coupled to the marker 30 by an adhesive or a sealant material. The exterior side 132 of the front plaque plate 130 includes a second personal information 148. The second personal information 148 may include the individual's name 150, date of birth 152, date of death 154, message 156, picture 158, photograph 160, text 162 and or designs 164.

The plaque housing 120 may be constructed of a ceramic porcelain material. The exterior side 132 of the front plaque plate 130 may include a photograph 170 of the deceased individual wherein the photograph 170 is fired into the ceramic porcelain material. Alternatively, the plaque housing 120 may be constructed of a polymeric, metallic or other rigid materials.

The exterior side 132 of the front plaque plate 130 may further include a transponder circuit symbol 172. The transponder circuit symbol 172 provides notice to the passerby of the transponder circuit 60 positioned within the plaque housing 120. The transponder circuit symbol 172 may include a word mark, logo, composite mark or other symbol.

FIGS. 9-13, illustrate the transponder circuit 60 being positioned within a plaque plate 180. The plaque plate 180 includes a front side 182 and a rear side 184. A circuit recess 186 is in the rear side 184 of the plaque plate 180 for receiving the transponder circuit 60. The rear side 184 of the plaque plate 180 is coupled to the marker 30. The rear side 184 of the plaque plate 180 is coupled to the marker 30 by an adhesive or a sealant material. The front side 182 of the plaque plate 180 may include a second personal information 148 including the individual's name 150, date of birth 152, date of death 154, message 156, picture 158, photograph 160, text 162 and or designs 164.

The plaque plate 180 may be constructed of a ceramic porcelain material. The front side 182 of the plaque plate 180 may include a photograph 170 of the deceased individual wherein the photograph 170 is fired into the ceramic porcelain material. Alternatively, the plaque plate 180 may be constructed of a polymeric, metallic or other rigid materials.

The front side 182 of the plaque plate 180 may further include a transponder circuit symbol 172. The transponder circuit symbol 172 provides notice to the passerby of the transponder circuit 60 positioned within the plaque plate 180. The transponder circuit symbol 172 may include a word mark, logo, composite mark or other symbol.

FIGS. 14 and 15, illustrate the transponder circuit 80 being positioned within an urn 34. The urn 34 includes a recessed groove 190. The recessed groove 190 includes a flat back surface 192 for maintaining the transponder circuit 80 in a linear orientation. A circuit housing 194 includes a front side 196 and a rear side 198. The rear side 198 of the circuit housing and 94 has a circuit recess 200 for receiving the transponder circuit 60. The rear side 198 of the circuit housing 194 is inserted into the recessed groove 190 for coupling the circuit housing 194 to the urn 34 and encapsulating the transponder circuit 60 into the urn 34.

The front side 196 of the circuit housing 194 may include a second personal information 148 including the individual's name 150, date of birth 152, date of death 154, message 156, picture 158, photograph 160, text 162 and or designs 164.

The circuit housing 194 may be constructed of a ceramic porcelain material. The front side 196 of the circuit housing 194 may include a photograph 170 of the deceased individual wherein the photograph 170 is fired into the ceramic porcelain material. Alternatively, the circuit housing 194 may be constructed of a polymeric, metallic or other rigid materials.

The front side 196 of the circuit housing 194 may further include a transponder circuit symbol 172. The transponder circuit symbol 172 provides notice to the passerby of the transponder circuit 60 positioned within the circuit housing 194. The transponder circuit symbol 172 may include a word mark, logo, composite mark or other symbol.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A memorial data system for providing information regarding a deceased individual, the memorial data system, comprising:
   a marker for identifying the deceased individual;
   a transponder circuit coupled to said marker;
   a data stored within said transponder circuit;
   a mobile electrical device for transmitting an electromagnetic field in close proximity to said transponder circuit;
   said transponder circuit receiving said electromagnetic field for powering said transponder circuit;
   said transponder circuit transmitting said data to said mobile electronic device;
   said mobile electronic device utilizing said data to access an electronic file on a network; and
   said electronic file including personal information regarding the deceased individual.

2. A memorial data interface device for providing information regarding a deceased individual as set forth in claim 1, wherein said marker selected from the group consisting of a headstone, urn, and burial vault.

3. A memorial data interface device for providing information regarding a deceased individual as set forth in claim 1, wherein said transponder circuit includes a near field communication circuit.

4. A memorial data interface device for providing information regarding a deceased individual as set forth in claim 1, wherein said data includes a uniform resource locator.

5. A memorial data interface device for providing information regarding a deceased individual as set forth in claim 1, wherein said mobile electrical device selected from the group consisting of a mobile phone, tablet, and mobile personal computer.

6. A memorial data interface device for providing information regarding a deceased individual as set forth in claim 1, wherein said network includes the world wide web.

7. A memorial data interface device for providing information regarding a deceased individual as set forth in claim 1, wherein said personal information selected from the group consisting of a biographic history, family tree, photograph, movie and awards.

8. A memorial data interface device for providing information regarding a deceased individual as set forth in claim 1, further including a plaque housing;
   said plaque housing having a rear plaque plate and a front plaque plate;
   said rear plaque plate including an exterior side and an interior side;
   said front plaque plate including an exterior side and an interior side;
   an adhesive gasket layer couples said interior side of said rear plaque plate with said interior side of said front plaque plate;
   said adhesive gasket layer defines a plaque void between said rear plaque plate with said front plaque plate;
   said transponder circuit positioned within said plaque void;
   said exterior side of said rear plaque coupled to said marker; and
   said exterior side of said front plaque including a second personal information.

9. A memorial data interface device for providing information regarding a deceased individual as set forth in claim 8, further including a transponder circuit symbol coupled to said exterior side of said front plaque; and
   said transponder circuit symbol providing notice of the transponder circuit positioned within said plaque housing.

10. A memorial data interface device for providing information regarding a deceased individual as set forth in claim 1, further including a plaque plate;
    said plaque plate including a front side and a rear side;
    a circuit recess in said rear side of said plaque plate for receiving said transponder circuit;
    said rear side of said plaque plate coupled to said marker; and
    said front side of said plaque plate including a second personal information.

11. A memorial data interface device for providing information regarding a deceased individual as set forth in claim 10, further including a transponder circuit symbol coupled to said front side of said plaque plate; and
    said transponder circuit symbol providing notice of the transponder circuit positioned within said plaque plate.

12. A memorial data interface device for providing information regarding a deceased individual as set forth in claim 1, wherein said marker includes a urn;
    a circuit housing including a front side and a rear side;
    a circuit recess in said rear side of said circuit housing for receiving said transponder circuit;
    said rear side of said circuit housing coupled to said urn;
    said front side of said circuit housing including a transponder circuit symbol coupled to said front side of said circuit housing; and
    said transponder circuit symbol providing notice of the transponder circuit positioned within said circuit housing.

13. A memorial data system for providing information regarding a deceased individual, the memorial data system, comprising:
    a marker for identifying the deceased individual;
    a transponder circuit coupled to said marker;
    a data stored within said transponder circuit;
    a mobile electrical device for transmitting an electromagnetic field in close proximity to said transponder circuit;
    said transponder circuit receiving said electromagnetic field for powering said transponder circuit;
    said transponder circuit transmitting said data to said mobile electronic device;
    said mobile electronic device utilizing said data to access an electronic file on a network;
    said electronic file including personal information regarding the deceased individual;
    said marker selected from the group consisting of a headstone, urn, and burial vault;
    said transponder circuit includes a near field communication circuit;
    said data includes a uniform resource locator;
    said mobile electrical device selected from the group consisting of a mobile phone, tablet, and mobile personal computer; and
    said network includes the world wide web.

14. A memorial data interface device for providing information regarding a deceased individual as set forth in claim 13, wherein said personal information selected from the group consisting of a biographic history, family tree, photograph, movie and awards.

15. A memorial data interface device for providing information regarding a deceased individual as set forth in claim 13, further including a plaque housing;
    said plaque housing having a rear plaque plate and a front plaque plate;
    said rear plaque plate including an exterior side and an interior side;

said front plaque plate including an exterior side and an interior side;

an adhesive gasket layer couples said interior side of said rear plaque plate with said interior side of said front plaque plate;

said adhesive gasket layer defines a plaque void between said rear plaque plate with said front plaque plate;

said transponder circuit positioned within said plaque void;

said exterior side of said rear plaque coupled to said marker; and said exterior side of said front plaque including a second personal information.

16. A memorial data interface device for providing information regarding a deceased individual as set forth in claim 15, further including a transponder circuit symbol coupled to said exterior side of said front plaque; and said transponder circuit symbol providing notice of the transponder circuit positioned within said plaque housing.

17. A memorial data interface device for providing information regarding a deceased individual as set forth in claim 13, further including a plaque plate;

said plaque plate including a front side and a rear side;

a circuit recess in said rear side of said plaque plate for receiving said transponder circuit;

said rear side of said plaque plate coupled to said marker; and said front side of said plaque plate including a second personal information.

18. A memorial data interface device for providing information regarding a deceased individual as set forth in claim 17, further including a transponder circuit symbol coupled to said front side of said front plaque; and said transponder circuit symbol providing notice of the transponder circuit positioned within said plaque housing.

19. A memorial data interface device for providing information regarding a deceased individual as set forth in claim 13, wherein said marker includes a urn;

a circuit housing including a front side and a rear side;

a circuit recess in said rear side of said circuit housing for receiving said transponder circuit;

said rear side of said circuit housing coupled to said urn;

said front side of said circuit housing including a transponder circuit symbol coupled to said front side of said circuit housing; and said transponder circuit symbol providing notice of the transponder circuit positioned within said circuit housing.

* * * * *